(12) United States Patent
Gedevanishvili et al.

(10) Patent No.: US 6,512,216 B2
(45) Date of Patent: Jan. 28, 2003

(54) MICROWAVE PROCESSING USING HIGHLY MICROWAVE ABSORBING POWDERED MATERIAL LAYERS

(75) Inventors: Shalva Gedevanishvili, Richmond, VA (US); Dinesh K. Agrawal, State College, PA (US); Rustum Roy, State College, PA (US); Balasubramaniam Vaidhyanathan, Loughborough (GB)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 10/052,139

(22) Filed: Jan. 17, 2002

(65) Prior Publication Data

US 2002/0108949 A1 Aug. 15, 2002

Related U.S. Application Data

(60) Provisional application No. 60/262,206, filed on Jan. 17, 2001.

(51) Int. Cl.$^7$ ................................................. H05B 6/64
(52) U.S. Cl. ....................... 219/759; 219/756; 219/762; 419/52; 264/432
(58) Field of Search ................................ 219/759, 762, 219/730, 678, 679, 686, 698, 756; 419/31, 48, 52, 53, 56, 57; 264/432, 434

(56) References Cited

U.S. PATENT DOCUMENTS

| | | | |
|---|---|---|---|
| 3,783,220 A | 1/1974 | Tanizaki | 219/10.55 |
| 4,307,277 A * | 12/1981 | Maeda et al. | 219/759 |
| 4,822,966 A * | 4/1989 | Matsubara | 219/756 |
| 5,164,130 A | 11/1992 | Holcombe et al. | 264/26 |
| 5,202,541 A * | 4/1993 | Patterson et al. | 219/759 |
| 5,432,325 A * | 7/1995 | Katz et al. | 219/762 |
| 5,808,282 A * | 9/1998 | Apte et al. | 219/679 |
| 6,183,689 B1 | 2/2001 | Roy et al. | 419/38 |
| 6,293,986 B1 * | 9/2001 | Rodiger et al. | 419/45 |

OTHER PUBLICATIONS

S. Gedevanishvili, D. Agrawal, R. Roy—Microwave Combustion Synthesis and Sintering of Intermetallics and Alloys, article in Journal of Materials Science Letters 18 1999, pp. 665–668.

* cited by examiner

Primary Examiner—Philip H. Leung
(74) Attorney, Agent, or Firm—Edward W. Goebel, Jr.; MacDonald, Illig, Jones and Britton LLP (57) ABSTRACT

A method of heating an article with microwave energy is described in which a thin layer of highly microwave absorbent powdered material is provided around at least a portion of a container made of microwave transparent material. The article to be heated is placed at a position within the container where the article is adjacent the thin layer of highly microwave absorbent powdered material, and microwave energy is applied to the container.

73 Claims, 9 Drawing Sheets

MICROWAVE PROCESSING USING HIGHLY MICROWAVE ABSORBING POWDERED MATERIAL LAYERS

This application claims the benefit of U.S. Provisional Application No. 60/262,206 filed Jan. 17, 2001, which is hereby incorporated herein by reference in its entirety.

TECHNICAL FIELD

This invention relates to methods for processing materials through the use of microwave energy.

BACKGROUND

The application of microwave energy to process various kinds of materials in an efficient, economic and effective manner is emerging as an innovative technology. Microwaves are electromagnetic radiation with wavelengths ranging from about 1 mm to 1 m in free space with frequencies between approximately 300 GHz to 300 MHz, respectively. Microwaves have a practical industrial range of between about 500 MHz and 10 GHz. Today, only narrow bands of frequencies centered at 915 MHz and at 2.45 GHz are permitted by regulation for industrial and scientific applications without a special license.

Microwave heating of materials is fundamentally different from conventional radiation, conduction or convection heating. In the microwave process, the heat is generated internally within the material instead of originating from external heating sources. The material of the article being processed in fact becomes the source of the heat during processing. Microwave heating is a sensitive function not only of the material of the article being processed but also depends on such factors as the size, geometry and mass of the article. Microwaves can be transmitted, absorbed or reflected, depending on the material type with which they interact.

Microwave heating has gained significantly over conventional heating in recent years for materials synthesis and sintering due to its rapid heating rates, reduced processing times, and substantial energy savings, as well as for being an environmentally cleaner technology. Often the use of microwave heating processes has resulted in products made of materials having better structural uniformity, finer microstructure and improved properties. In spite of these advantages, there are several problems which have hindered the use of microwaves as a unified tool for materials processing. For example, in the case of metals, it is well known that at room temperature, the presence of solid or monolithic metal parts or thick metal films in a microwave field results in large electric field gradients which often cause visible and sometimes strong electric discharges. It was recently discovered that powder metal articles can be sintered by subjecting them to microwave energy to form a dense metal part. See U.S. Pat. No. 6,183,689 B1, issued Feb. 6, 2000, and entitled Process for Sintering Powder Metal Components. However, it is generally believed that monolithic metal articles at room temperature invariably cause plasma sparking within a microwave cavity, and they are therefore unsuitable for microwave processing, unless the metals have been previously, conventionally heated above a critical temperature, which is normally between about 400° C. and 600° C., above which they absorb microwaves and can be processed using microwaves without sparking.

In the case of ceramics, many ceramic materials do not couple well with microwave radiation at low temperatures. Since the use of microwaves for material synthesis or sintering rests heavily on the microwave absorbing capacity of the material being processed, these ceramic materials also have to be preheated by another heating source. One preheating source which has been used is a secondary microwave susceptor such as a bed of certain susceptor materials packed around the ceramic materials as the ceramics are being sintered or otherwise processed in a microwave field. The use of packed susceptor beds has often resulted in uneven heating. Additionally, as the ceramic material is sintered, it may shrink and lose contact with the bed, decreasing the effectiveness of the susceptor bed. The materials used in some microwave susceptor beds may themselves sinter or fuse together in the bed, leading to uneven or insufficient sintering of the material being heated. Additionally, some secondary microwave susceptor materials may decompose, contaminate or react with the material being processed. It has been reported that the use of carbon alone as a susceptor bed, as well as the use of related materials such as graphite and SiC, with or without placing an item being sintered in a graphite crucible, limits the maximum temperature that can be achieved to values much less than those required for sintering. See Example 9, Col. 11, line 59–Col. 12, line 12 of U.S. Pat. No. 5,808,282 issued Sep. 15, 1998.

Alternately, rods made of SiC or $MoSi_2$ or similar materials are placed adjacent to the ceramic material being processed as secondary microwave susceptors to heat the ceramic material at low temperatures in the microwave field. The use of such rods as microwave susceptors has met with limited success due to slow heating rates encountered and the high cost of the rods themselves.

Additionally, the processing of other materials which are heated with microwaves, such as powdered metals, composites and glass, can benefit from an improved microwave process that decreases the required heating time and improves the properties of the material.

SUMMARY

In accordance with one embodiment of this invention, a method of heating an article being processed with microwave energy comprises providing a thin layer of highly microwave absorbent powdered material around at least a portion of a container made of microwave transmitting material for the article. The article is placed within the container at a position where the article is adjacent the thin layer of highly microwave absorbent powdered material. Microwave energy is applied to the container to heat the article.

The highly microwave absorbent powdered material ("HMAPM") used in this method comprises any material which can, at room temperature, absorb most or substantially all of the microwaves directed at it and generate heat which can be transferred to the article being heated. HMAPM includes powdered material having a high percentage by weight of carbon, such as carbon, graphite, carbon black, SiC and coal.

The thin layer of HMAPM can be provided around at least a portion of a container in any convenient manner to initially generate heat for the article being processed. The thickness of the layer of HMAPM is determined empirically. In one embodiment, the thin layer is formed by mixing HMAPM with a liquid to make a paste. Water is preferably used, but any other satisfactory liquid may be used, as well. The paste can be applied as a thin layer to the outside of the container and dried or allowed to dry before use in a microwave oven.

In another embodiment, HMAPM in a dry, powdered state can be placed between the walls of a double-walled container. Or a double-walled container may have HMAPM applied to one or both of the inside surfaces of the double walls and dried so that the dried paste forms a layer of HMAPM between the walls. The thin layer of HMAPM between the double walls in either a powder or paste form may be vacuum sealed or sealed with an inert gas. Alternatively, the thin layer of HMAPM may be retained on or within a structure located around at least a portion of the container. Examples of such structures are spirals or one or more rings.

An article is adjacent the thin layer of HMAPM in the container when it is in the vicinity of the thin layer so that the article obtains the benefit of the absorption of the microwave energy by the thin layer of HMAPM and receives the heat transfer from the thin layer. How close any particular article should be to the thin layer is determined empirically and will depend on the size and shape of the article being heated, the material out of which the article is constructed, and the size and shape of the container in which the article is placed.

While the method of this invention may be used in a number of different embodiments, it is particularly useful in an embodiment in which the thin layer of HMAPM is provided around the total circumference of the container with a length at least equal to the length of the article being heated. Making the coating somewhat longer than the length of the article can assure even heating of the article. The article is placed within the length of the thin layer of HMAPM and microwave energy is applied to the container to heat the article.

Alternatively, uneven heating can be provided to articles, such as composites of two or more materials, by either providing a thin layer of HMAPM around less than the total circumference of the container, and placing the part of the article which is to receive greater heat adjacent the thin layer, or providing a thin layer of HMAPM on one side of a sheet of material or between the walls of a double-walled sheet of material and placing the part of the article to receive greater heat adjacent the thin coating. Alternatively, uneven heating of an article can be accomplished by placing less than the full length of the article adjacent the thin coating. When an article is properly placed with respect to the thin layer, microwave energy is applied to the container or to the sheet of material, as the case may be.

Articles to be heated according to this method may be made of industrial materials which can be processed with microwaves, including ceramics, powdered metals and glass. Where the thin layer of HMAPM is provided around the total circumference of a container and the article can be placed within the length of the thin layer, this method can be used to heat articles made of monolithic metals, including Cu., Ag., Au., Pt., Al., Ga., Fe., steel, brass, W., Re., Ta., Mo., Nb., Ni., Co., V., Cr., Sn., and metal alloys and metal compositions of any of the foregoing metals, regardless of whether the metals are at room temperature or any other temperature.

This invention does not reside in any one of the features of the method disclosed above or more fully described in the Detailed Description and claimed below. Rather, this invention is distinguished from the prior art by the combination of features which make it a unique method. Important features of this invention are shown and described below to illustrate the best mode contemplated to date of carrying out this invention.

However, those skilled in the art will understand that this invention is capable of being carried out in many embodiments which are different from those shown and described herein. Thus, the details of the method of this invention can be changed in various manners without departing from the scope of this invention. Accordingly, the drawings and description are to be regarded as illustrative in nature and are not to restrict the scope of this invention. Additionally, the claims are to be regarded as including such equivalent methods as do not depart from the nature and scope of this invention.

BRIEF DESCRIPTION OF THE DRAWINGS

For a more complete understanding and appreciation of this invention, and many of its advantages, reference will be made to the following detailed description taken in conjunction with the accompanying drawings.

FIGS. 7(a)–(j) are a series of photo micrographs showing micro structures and porosity distribution of three powdered metal articles after each of the articles was sintered using one of three different processes, including the method of this invention.

DETAILED DESCRIPTION

Referring to the drawings, identical reference numerals designate the same or corresponding parts throughout the several figures shown.

It should be understood, initially, that this invention can be applied to any type of microwave processing system which is used for scientific or industrial purposes. This includes both batch and continuous processing microwave systems of various sizes and designs. The most practical systems will apply microwave radiation at the practical industrial range of between about 500 MHz and about 10 GHz.

Figure 1:
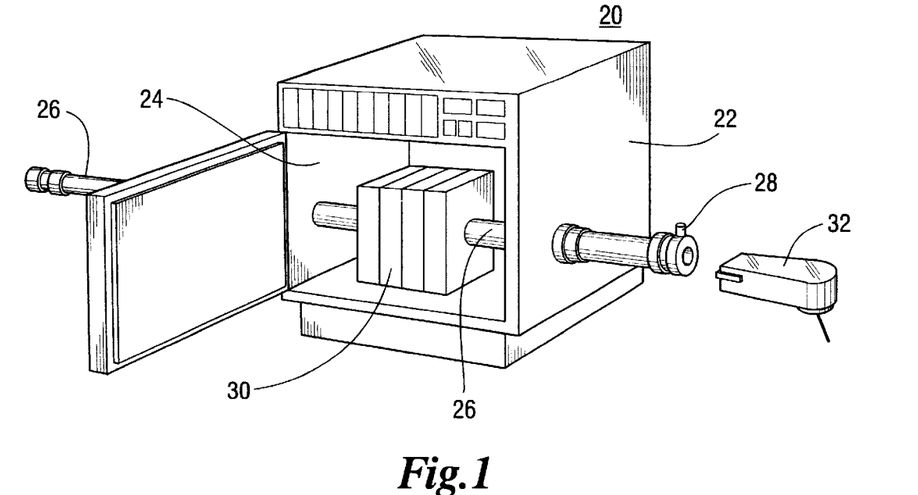
FIG. 1 is a perspective, schematic drawing showing one type of microwave system which can be used to carry out this invention.

FIG. 1 illustrates a schematic design of the microwave system 20 used in most of the examples described herein. It involves a 2.0 kW commercial microwave oven 22 (Amana Radarange, model RC/20SE) with a 2.45 GHz multimode cavity 24. The oven is cooled by circulating cold water through copper tubing, not shown, fixed at the top and sides of the double jacketed oven by brazing. Compressed air was circulated inside the cavity to keep the sensor positioned near the magnetron of the oven 22 from getting heated and thereby stopping the power supply to the magnetron. A 1.25" O.D.×1.0" I.D.×36" long tube made of silica, alumina, zirconia, mullite or a similar suitable microwave transmitting material is introduced at the center of the oven 22. The tube 26 is supported mechanically by fixing two aluminum tubes with flanges, not shown, from inside to provide support at the two ends. The aluminum flange interface with the side wall was sealed from inside using an aluminum foil for avoiding any microwave leakage. A gas of a desired atmosphere, such as air for processing articles made of oxide materials or an inert or reactive atmosphere for non-oxide materials, is allowed to flow from forming gas port 28 and through tube 26, or a vacuum can be drawn, depending on the need of the material used and the process performed. A mullite based insulation package 30 made from Fiberfrax boards was used to surround the tube 26 at the center of the cavity 24 to prevent the heat from dissipation during the heating of the article being processed. The articles being processed were placed in an appropriate container, such as a cylinder or a crucible, made of microwave transmitting material, at the center of the tube 26.

Figure 2:
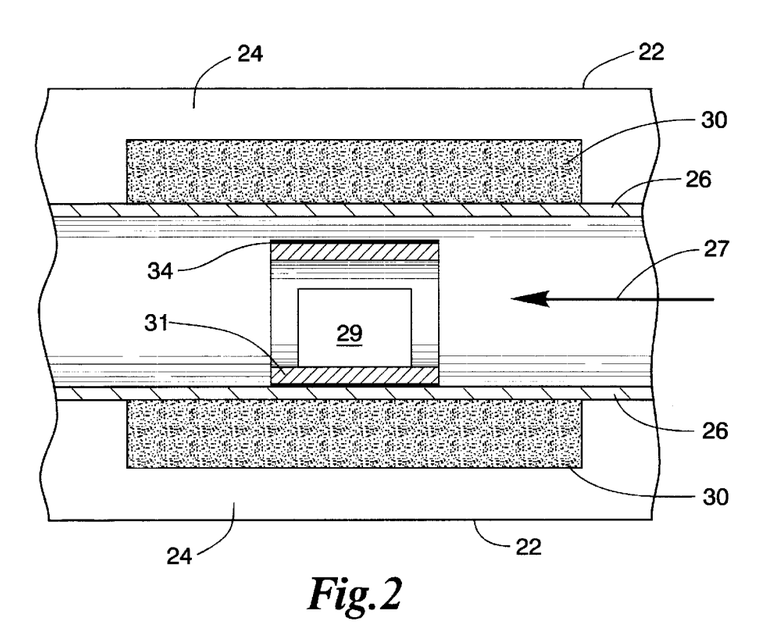
FIG. 2 is a cross section of a schematic diagram of the inside of a microwave cavity within which this invention can be carried out.
Figure 10A:
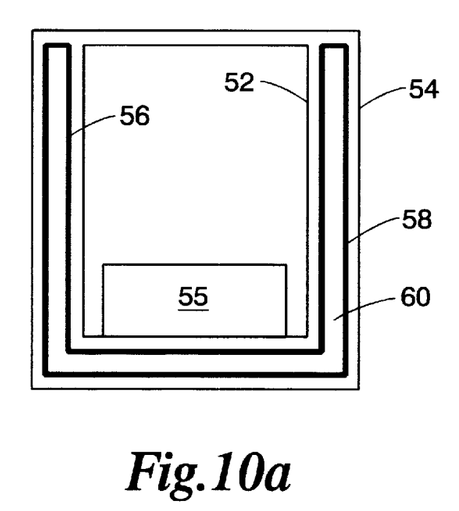
FIG. 10(a) is a cross section of a double-walled crucible which has its inner walls coated with a layer of HMAPM in accordance with this invention.
Figure 10B:
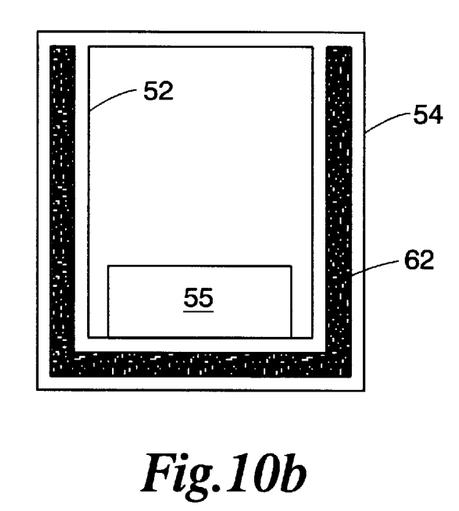
FIG. 10(b) is a cross section of a double-walled crucible having a thin layer of HMAPM in powdered form between its walls.

Refer to FIG. 2, a schematic diagram of the inside of the microwave cavity 24, in which an article 29 is placed within a container comprising cylinder 31 that is located in the center of the tube 26. An arrow 27 represents the atmosphere flowing within the tube 26. The tube was made of mullite for the examples described below, although a suitable container could be made of silica, alumina, zirconia or any other microwave transmitting material. For illustrative purposes the container which was used and coated with HMAPM in accordance with this invention was a cylinder in FIG. 2 and a crucible in FIGS. 10(a), 10(b) and 11. However, this container can be of any shape and size useful for processing articles according to this invention. The container may be single walled as shown in FIG. 2 or may be multi-walled as shown in FIGS. 10(a) and 10(b). The temperature of the articles was monitored using an infrared pyrometer 32 (Raytek, Marathon Series) with the circular cross wire focused on the sample cross section. The infrared pyrometer was integrated to a personal computer for accessing the temperature data as a function of time. The temperature was also measured using a conventional optical pyrometer (Leeds & Northrup) as a reference and in case of any temperature discrepancy, the latter was used as the correct temperature.

As pointed out above, the thin layer of HMAPM can be made up of any material which can, at room temperature, absorb most or substantially all of the microwaves directed at it and generate heat. It includes powdered material having a high percentage by weight of carbon, such as carbon, graphite, carbon black, SiC and coal. Where the thin layer was provided in the form of a paste for the examples described below, the paste was made from graphite and water with an initial pH between about 10–10.5. The paste was applied uniformly on the ceramic container, either a tube or a crucible, which can be made of a microwave transmitting material such as silica, alumina, zirconia, or mullite. The optimum thickness of the thin layer of carbon to be used is determined empirically, depending on the size and shape of the article being heated and the size and shape of the container which is coated. The paste was actually applied to the outside surface of the container so it would not contaminate the article being heated when the graphite in the paste heated to a temperature at which it oxidized. If, due to the nature of the process or the material of the article being heated, the article is not contaminated by oxidation of the paste, the paste could be placed on the inside of the container. After the coating was applied to the ceramic container, it was allowed to dry in an oven at about 100° C. for about 10 minutes. It will be obvious to those skilled in the art that any suitable HMAPM could be used for the paste, a liquid other than water could be used to make the paste and the coating could be dried using any convenient process.

Powdered metal articles can be rapidly and efficiently sintered using the thin HMAPM layer according to the method of this invention.

EXAMPLE 1

Figure 3:
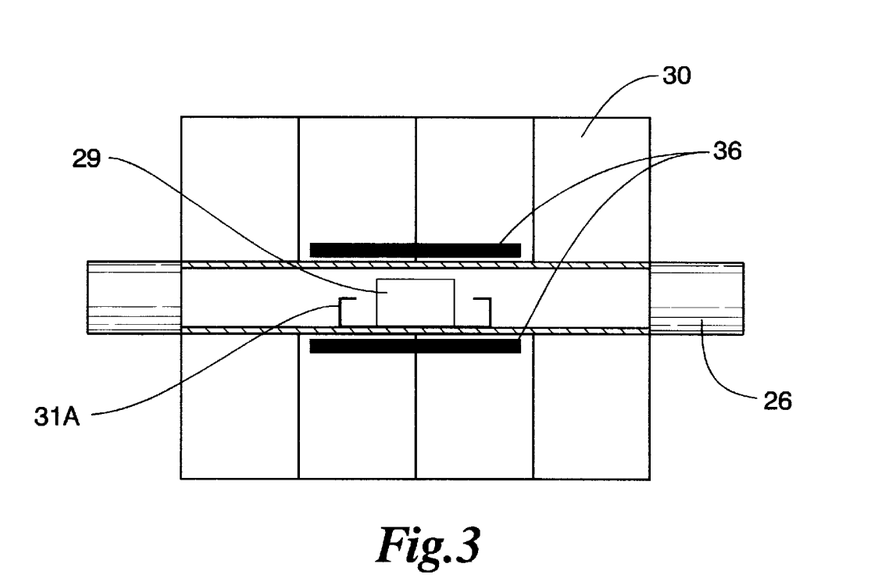
FIG. 3 is a cross section of a schematic diagram of a portion of a microwave cavity having SiC rods as susceptors for heating an article.
Figure 4:
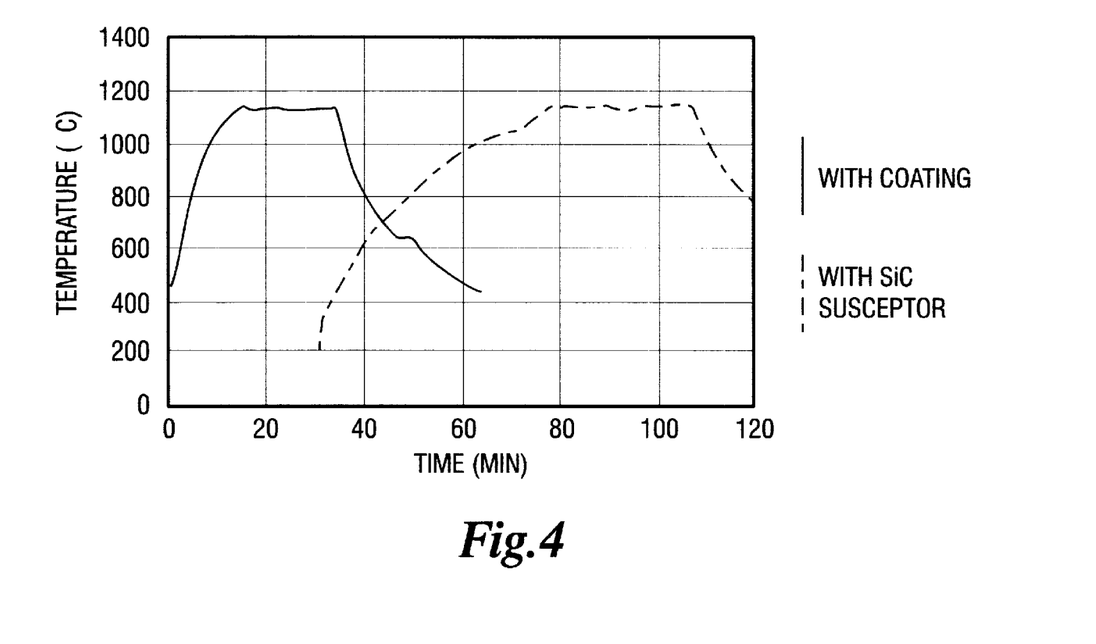
FIG. 4 is a graph showing a comparison of the time-temperature profiles for the microwave sintering of representative powdered steel specimens.

As shown in FIG. 2, a graphite paste was applied to the outside surface of the cylinder 31 to form a graphite layer 34. A green powdered metal article 29 for each process cycle was chosen from material samples of steel compositions FC208: Fe+Cu (2 wt %)+C (0.8 wt %) and FN208: Fe+N: (2 wt %)+C (0.8 wt %) having a weight of about 20 g. The samples were heated for about 6 hours at 500° C. to completely remove the binder from the samples. Each sample chosen as an article 29 to be sintered was placed inside the graphite coated ceramic cylinder 31 which was in turn placed in the larger ceramic cylinder 26 in a microwave cavity. Microwave processing cycles were carried out both in flowing argon or a forming gas (95% $N_2$+5% $H_2$ mixture) ambient having a dew point of −60° C. Following the application of microwaves within the cavity 24, the temperature at the article 29 was raised to 1140° C. and held for 20 minutes. The oven 22 was then switched off and the article 29 was allowed to cool and was evaluated. The sintered density of the sample was 97% theoretical. A similar powdered metal sample was sintered at 1140° C. in the microwave oven 22, in a similar manner, using SiC rods as susceptors rather than the graphite coating. As shown in FIG. 3 SiC rods were located at equal intervals around the center of the tube 26. The sample 29 was placed in a container 31a which is an alumina boat that was then located at the center of the microwave oven. Microwave processing was then carried out in an atmosphere as indicated, above. FIG. 4 shows a comparison of the time-temperature profiles for the microwave sintering of representative powdered steel metal specimens when SiC rods and when the graphite coatings applied according to this invention were used as secondary heaters in the microwave field. It is evident that in the method of this invention, which used graphite as the thin layer of HMAPM on the cylinder container, the whole process was over in about half of the time normally used in a typical, conventional microwave method using SiC rods as susceptors.

EXAMPLE 2

Green powdered metal material samples of the copper steel composition FC208 were chosen having a weight of about 20 g. Separate samples were sintered at 1140° C. and 1260° C. in the forming gas ambient set forth in Example 1 for one of four sintering processes employed. Copper steel samples were separately sintered at 1140° C. and 1260° C., respectively, in the microwave oven 22 inside the graphite coated ceramic cylinder 31 in accordance with the method of this invention and in the manner explained in Example 1. Other green powdered metal copper steel samples were sintered using silicon carbide rods as susceptors, rather than the graphite coating, at 1140° C. and 1260° C., respectively, as also explained in Example 1. Additional green powdered metal copper steel samples were sintered in the microwave oven 22 at 1140° C. and 1260° C. for 20 minutes in accordance with the process set forth in Example 1, but without the use of either the graphite coating cylinder 31 or the SiC rods as susceptors. Green powdered metal copper steel samples were also conventionally sintered at 1140° C. and 1260° C. for 20 minutes in the forming gas ambient described in Example 1. The conventional sintering was carried out in an alumina tube furnace (Lindberg) fitted with a Proportional-Integral-Differential type temperature controller (Eurothern).

Figure 5:
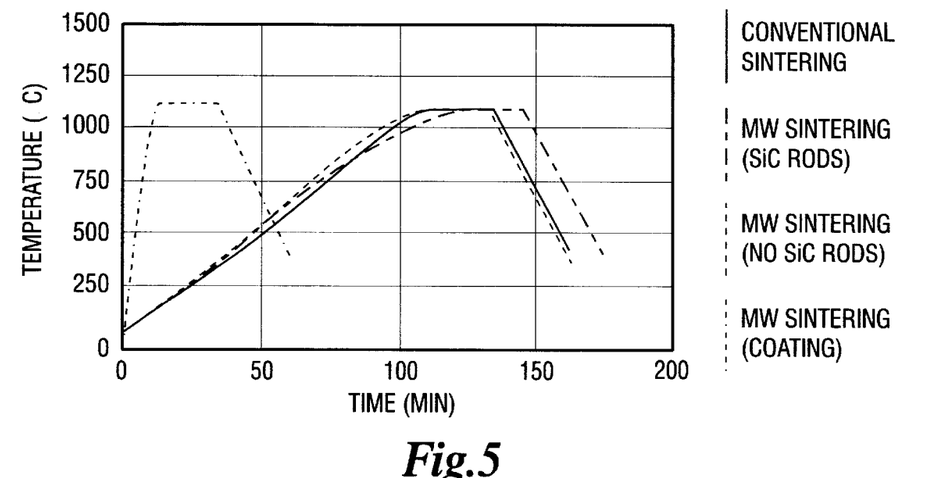
FIG. 5 is a graph showing a comparison of time-temperature profiles for the sintering of powdered metal samples at 1140° C. using four different processes, including the method of this invention.
Figure 6:
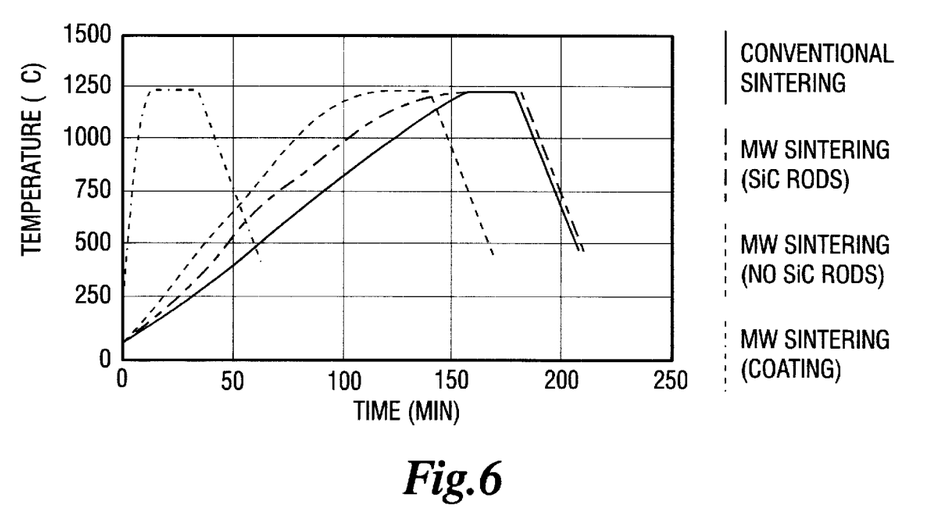
FIG. 6 is a graph showing a comparison of time-temperature profiles for the sintering of powdered metal samples at 1260° C. using four different processes, including the method of this invention.

The typical temperature-time profiles for the conventional sintering and the three processes of microwave sintering, explained above, of copper steel samples at 1140° C. and at 1260° C. are shown in FIGS. 5 and 6, respectively. It is clear from these figures that microwave sintering of these samples, using the thin HMAPM layer on the container 31, yielded substantially faster heating rates as compared to any of the other heating methods used, with considerable savings in time.

Figure 7:
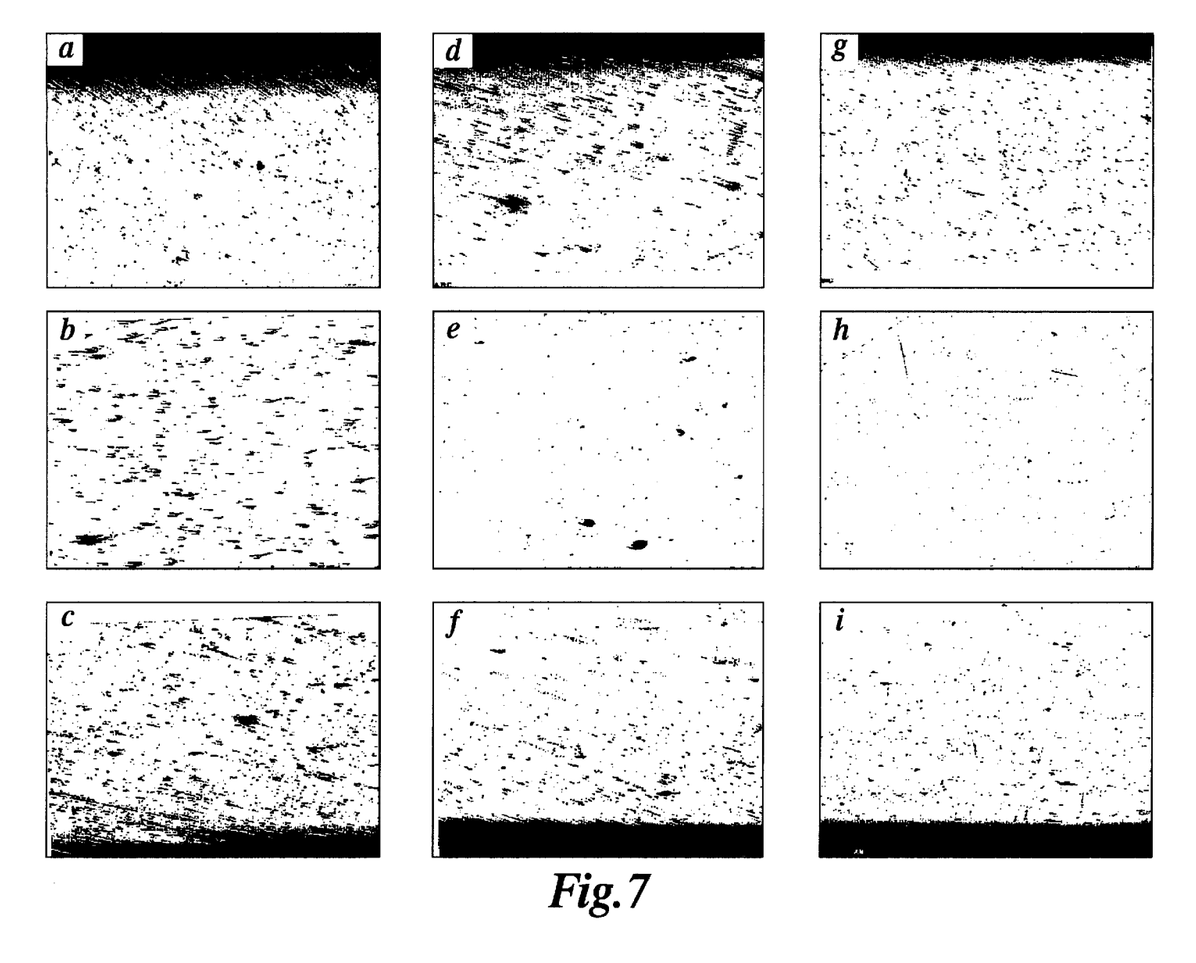

The microstructures and porosity distributions of the conventional and microwave sintered samples, as a function of depth, using both SiC rods and the coating susceptors, are shown in FIGS. 7(a)–7(i). The micrographs of FIGS. 7(a)–7(c) represent conventional sintering, micrographs of FIGS. 7(d)–7(i) represent microwave sintering with SiC rods as susceptors, and micrographs of FIGS. 7(g)–7(i) represent microwave sintering using the graphite coating on the container as a susceptor according to the method of this invention. The center micrographs of each set, FIGS. 7(b), 7(e) and 7(h) represent the core for each of the above samples, while the balance of the micrographs represent the edges of the samples.

From the micrographs of FIGS. 7(a), 7(b) and 7(c), it is evident that conventional sintering resulted in non-uniform microstructure, with denser edges and a more porous core. This is a typical feature of conventional sintering of powdered metal parts. From the micrographs of FIGS. 7(d), 7(e) and 7(f), it is clear that microwave sintering with SiC rods as susceptor resulted in a lesser degree of non-uniform microstrucure and a significant reversal of the conventional situation, i.e. a denser core and more porous edges. This is typical of most ceramic parts sintered in a conventional microwave process, indicating that heat transport is from inside out, and the interior of the material may be hotter than the surface. However, from the micrographs of FIGS. 7(g), 7(h) and 7(i), it is obvious that microwave sintering with the graphite coating as a susceptor in accordance with this invention resulted in very uniform micro structure with both a microwave uniformly dense core and microwave uniformly dense edges. This proves that in the heating method of this invention very uniform microstructures can be achieved.

Using the method of this invention, metal articles at room temperature can be heated and otherwise processed in a microwave cavity without plasma discharges.

EXAMPLE 3

Figure 8:
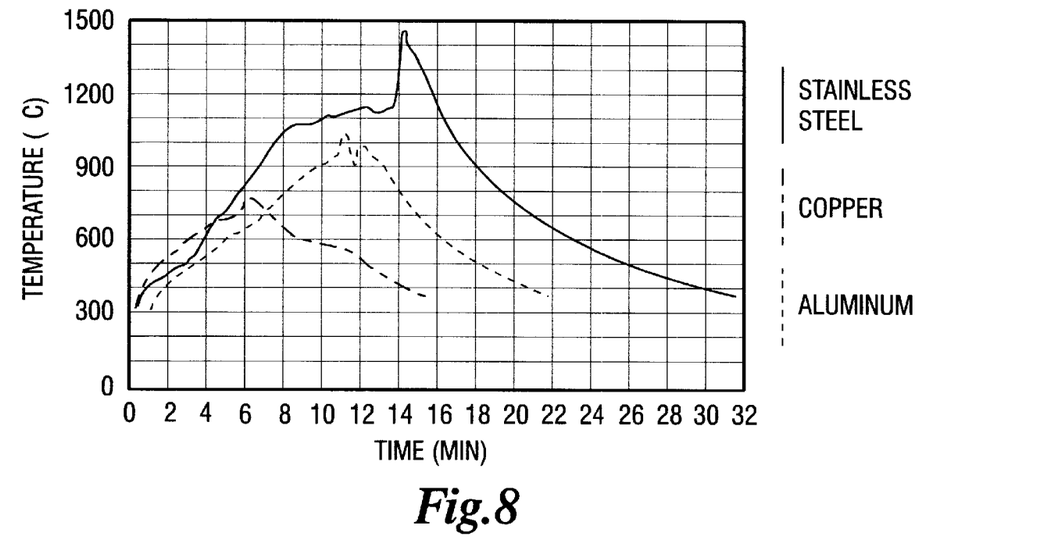
FIG. 8 is a graph showing time-temperature profiles for the melting aluminum, copper and stainless steel monolithic metal blocks using the method of this invention.

For each of three microwave heating process cycles in which the article 29 being heated was a solid block of a different metal, the microwave oven shown in FIG. 1 was used with the ceramic cylinder 31 having a thin coating of graphite paste 34 applied to its outside surface as shown in FIG. 2. Commercially available solid blocks of aluminum, copper and stainless steel, at room temperature, were placed in separate experiments inside the graphite coated cylinder 31 shown in FIG. 2, and microwave energy was applied. The samples were placed on an alumina boat inside the cylinder. Absolutely no arcing or any other physical electric discharges were noticed during the processing. Each of the metal blocks heated rapidly, indicating clearly that the graphite coating absorbed the microwave energy efficiently and provided a shielding effect for the solid metal at room temperature, apparently until the heat transferred from the coating heated the metal to its critical temperature, between about 400° C. to about 600° C., at which the metal absorbs microwave energy. The corresponding time-temperature profiles for the melting of the aluminum, copper and stainless steel metal blocks are shown in FIG. 8.

Using the method of this invention, articles at room temperature, or at any desired temperature below the critical temperature, of any shape made of any type of monolithic metals can be heated and otherwise processed in a microwave cavity without plasma discharges. This includes the metals Cu., Ag., Au., Pt., Al., Ga., Fe., steel, brass, W., Re., Ta., Mo., Nb., Ni., Co., V., Cr., Sn., and metal alloys and metal compositions of any of the foregoing metals. These metals can even be melted using this method and cast into desirable shapes.

Ceramics can also be efficiently and effectively processed using the method of this invention.

EXAMPLE 4

Ten discs of ZnO varistor green powdered metal samples, each having a diameter of about 7 mm, were placed in an alumina tube having a thin coating of graphite applied to it, as shown in FIG. 2, and exposed to microwaves in the microwave oven 22 shown in FIG. 1. The process was performed in air, and the temperature of the samples was measured using an infrared pyrometer as explained with respect to FIG. 1. The samples were soaked at 1100° C. for 15 minutes, and the sintered density of the microwave processed samples was found to be >98% theoretical. After the sintering process, the carbon coating on the ceramic tube was found to be completely oxidized away. This indicates that after reaching a critical temperature (~600° C.), the ZnO sample started absorbing microwaves efficiently by itself and attained the sintering temperature, even though the coated carbon was fully oxidized in the atmosphere. Hence the methodology of this invention provides a simple way to observe and understand the real effects of microwave irradiation on the sintering behavior of materials which begin efficiently absorbing microwaves at high temperatures. The use of other secondary susceptors like SiC or $MoSi_2$ rods or packed susceptor beds for the sintering of ceramics does not allow the decoupling of the real microwave effects on the ceramic materials alone, due to the presence of these susceptors in the microwave field even after the ceramic materials start absorbing the microwaves.

Figure 9:
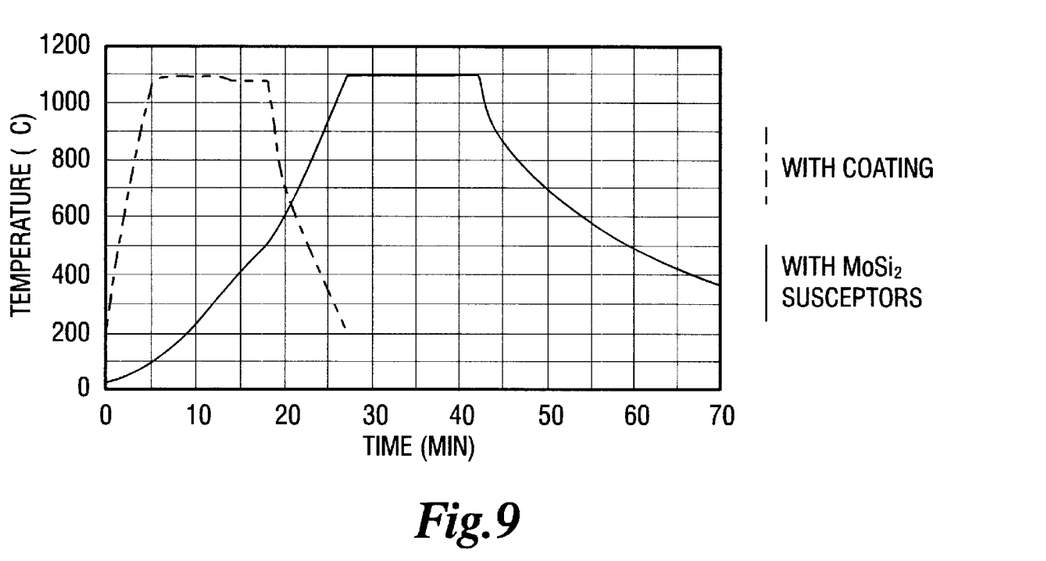
FIG. 9 is a graph showing the time-temperature profiles of the sintering of powdered metal ceramic articles at 1100° C. using two different processes, including the method of this invention.

FIG. 9 compares the time-temperature profiles of the microwave sintering of ZnO varistor samples using $MoSi_2$ rods in a configuration similar to that shown with respect to SiC rods in FIG. 3 with ZnO varistors sintered according to the method of this invention using the graphite HMAPM coating shown in FIG. 2, as described above. Surprisingly, using graphite HMAPM coating in the method of this invention, the complete sintering process, including heating, soaking and cooling steps, can be performed even before the ZnO sample reaches the sintering temperature, that is heating alone, during the microwave sintering process using the $MoSi_2$ susceptors. This clearly demonstrates the time and energy saving capabilities of the method of this invention.

In a procedure similar to that used with the graphite HMAPM coating in Example 3, a technologically important bioceramic, namely Hydroxyapatite (HAP) [$Ca_5$ ($PO_4$)$_3OH$], has been microwave sintered at 1300° C. to nearly 97% theoretical density in just 10 minutes.

For certain applications of this invention, it is advantageous to provide the thin layer of HMAPM between the walls of a double walled container as shown for illustrative purposes in FIGS. 10(a) and 10(b). If the container is constructed with a void between its double walls, the void may be filled with a thin layer of HMAPM in a dry state. The thickness of the layer of dry powdered HMAPM is determined empirically. Alternatively, the inside of one or both of a pair of separable walls can be coated with a thin layer of HMAPM paste, the paste dried and the container assembled. The resulting thin layer of HMAPM, whether made from dry powder or paste, can then be vacuum sealed or sealed with an inert gas.

Referring specifically to FIG. 10(a), the container shown is a crucible 50, which is double walled, including an inner wall 52 and an outer wall 54, both preferably made of a microwave transmitting quartz material. An article 55 to be processed is placed within the crucible 50. The surface of the inner wall 52 which faces the outer wall 54 is coated with a thin layer of HMAPM paste 56 comprising graphite and water, and the surface of the wall 54 which faces the wall 52 is also coated with a thin layer of graphite paste 58. The void 60 between the thin graphite layers 56 and 58 can be either vacuum sealed or sealed with an inert gas, as explained above.

As shown in FIG. 10(b), the void between the double walls 52 and 54 can be filled with a thin layer 62 of powdered HMAPM. This thin layer 62 can also be vacuum sealed or sealed with an inert gas.

Figure 11:
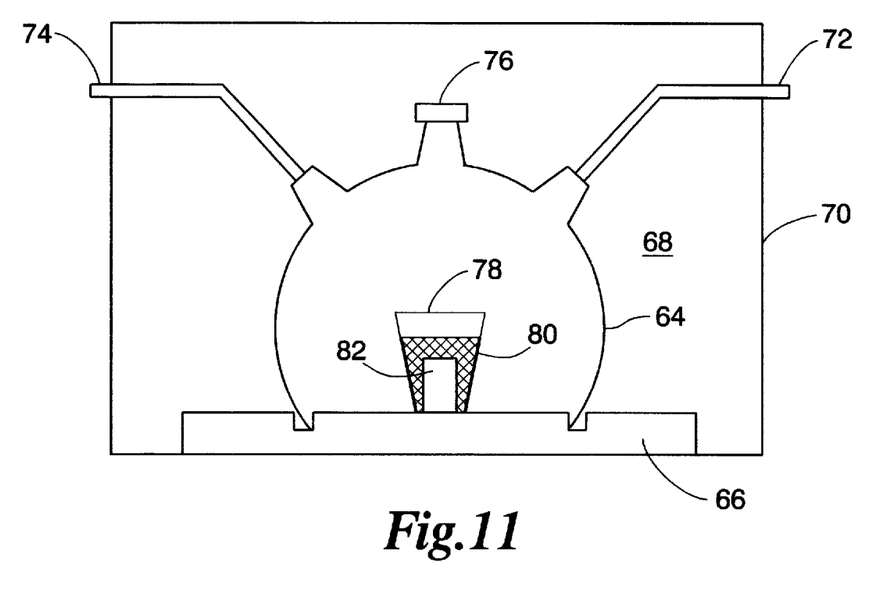
FIG. 11 is a cross section of a gas chamber in the cavity of a microwave oven which is used to perform the method of this invention.

In methods according to this invention for processing ceramic materials which do not couple with microwaves until the ceramic materials reach a temperature greater than about 700° C., the approximate temperature at which carbon oxidizes, a dual walled container as shown in FIGS. 10(a) and 10(b) can be used. Alternatively, a carbon coated single walled crucible with a thin layer of HMAPM on its outside surface may be kept in a flowing gas atmosphere as shown in FIG. 11. A glass chamber 64 can be mounted on a refractory base 66 and placed within a cavity 68 of a microwave oven 70. The gas chamber 64 has a gas inlet 72 for receiving reactive or inert gas, a gas outlet 74 for removal of the gas, and a stopper or opening 76 for temperature measurement. A container 78 has a thin layer 80 of HMAPM on its outside surface. A ceramic article 82 to be processed is then placed inside the coated container 78 in the cavity 68 and exposed to microwaves while a gas flows through the glass chamber 64. The gas chamber 64 would normally be insulated within the cavity 68 to retain the heat around the article 82. Using the apparatus shown in FIG. 11, ultra low thermal expansion phosphates including NZP [$NaZr_2(PO_4)_3$] and its derivatives have been microwave sintered to almost 97% of their theoretical densities. Also microwave assisted synthesis of this family of inorganic phosphates can be achieved in just 15 minutes with the method of this invention using the apparatus shown in FIG. 11.

Another important category of ceramics, namely non-oxide ceramics including nitrides, carbides and silicides of all metals and metal alloys, SiC, $Si_3N_4$, $B_4C$, $MoSi_2$ and AlN, can also be microwave processed, that is synthesized and/or sintered, using the apparatus shown in FIG. 11.

Yet another rich category of advanced ceramics, namely transparent ceramics such as $Al_2O_3$, AlON, AlN, spinels and mullite based transparent ceramics, which require very high temperatures, can also be fabricated in a very short period of time using this new microwave technique.

EXAMPLE 5

Using the method of this invention described above with respect to Example 4, including the container arrangement shown in FIG. 11 in a microwave oven, a number of glass melting compositions were efficiently melted in the carbon coated container 78 in the microwave field in just a few minutes. These melts were then be quenched between polished metal plates to obtain homogeneous glasses. Simple and doped phosphate glass samples were prepared using the method of this invention in just 5 minutes. The rapidity of the microwave assisted method of this invention avoids undesirable decomposition, leading to changes in the oxidation states of the metal cations used, minimizes the loss of volatile components from the reaction mixture, normally encountered during the high temperature-long duration conventional processing, and virtually eliminates the contamination of the charge by the crucible container material. The method of this invention can be effectively used for the remelting of the prepared glasses also.

The method of this invention can also be used to process composites of two or more materials.

EXAMPLE 6

Figure 12:
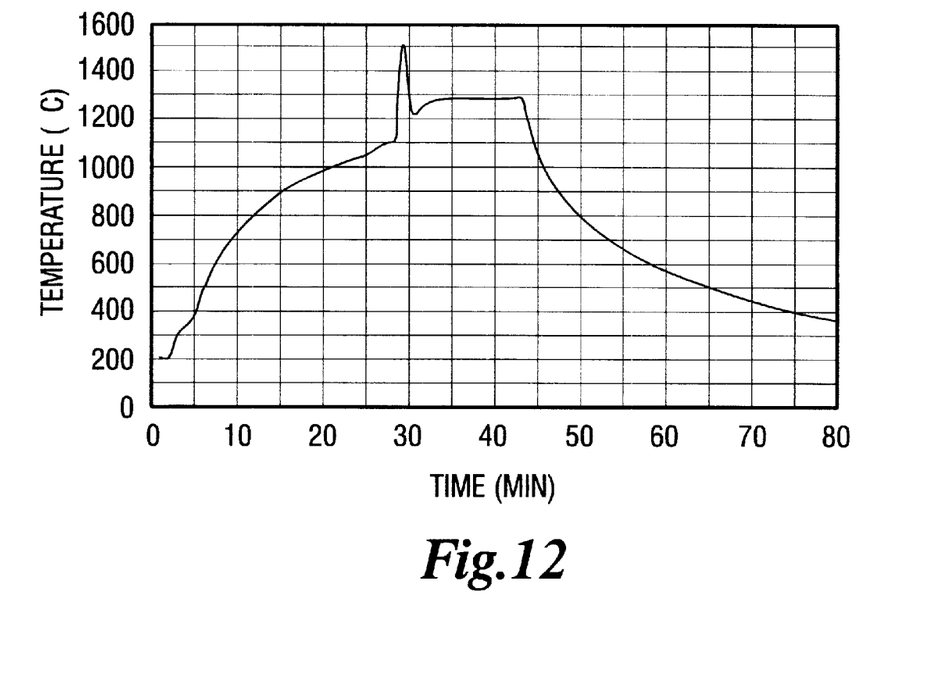
FIG. 12 is a graph of a time-temperature profile of the synthesis of a composite material using the method of this invention.

As a representative example, $MoSi_2$—SiC composites, which are very useful for high temperature structural engineering applications, have been synthesized using the microwave assisted method of this invention. Elemental powders of (Mo+Si+C) have been mixed in required stoichiometric proportions, ball milled and then pressed into pellets of 0.5" diameter. A pellet was then placed inside the graphite coated mullite tube which is housed in the microwave cavity as described earlier and shown in FIG. 2. When the microwaves were switched on, the sample reached around 1130° C. in 28 minutes as shown in the time-temperature profile in FIG. 12. At this point combustion reaction leading to the formation of $MoSi_2$—SiC composites took place and the sample temperature was raised to about 1500° C. in one minute. After this, the sample temperature was lowered to 1300° C., the specimen was soaked at this temperature for 20 minutes and then cooled. The formation of $MoSi_2$—SiC composite was confirmed by X-ray diffraction analysis. In a similar procedure, microwave assisted combustion synthesis of $TiB_2$—$Al_2O_3$; $TiB_2$—TiC; $Ni_3$—Al—$TiB_2$, composites has been accomplished using the graphite coated containers. Thus, this methodology allows one to synthesize and simultaneously sinter technologically important intermetallic composites including but not limited to $MoSi_2$—SiC, $TiB_2$—$Al_2O_3$, $TiB_2$—TiC, $Ni_3$—Al—$TiB_2$, and $Ni_3$—Al—TiC.

Figure 13A:
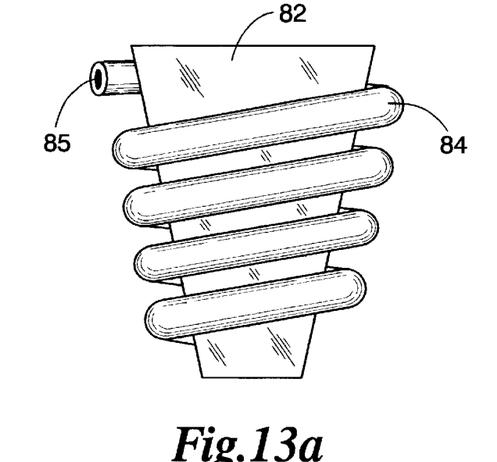
FIG. 13(a) is a schematic diagram of a container having a spiral structure formed on the container's outside surface, with a thin layer of HMAPM within the spiral.
Figure 13B:
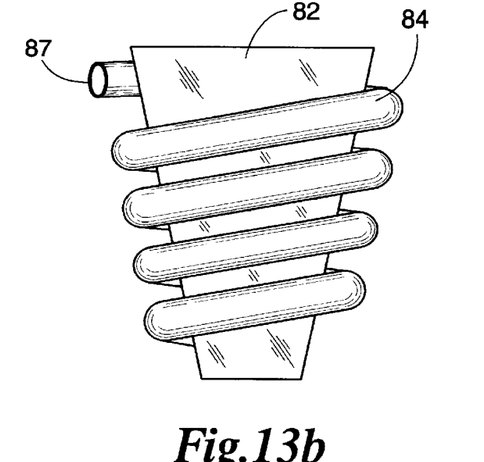
FIG. 13(b) is a schematic diagram of a container having a spiral structure formed on the container's outside surface, with a thin layer of HMAPM on the outside of the spiral.
Figure 14A:
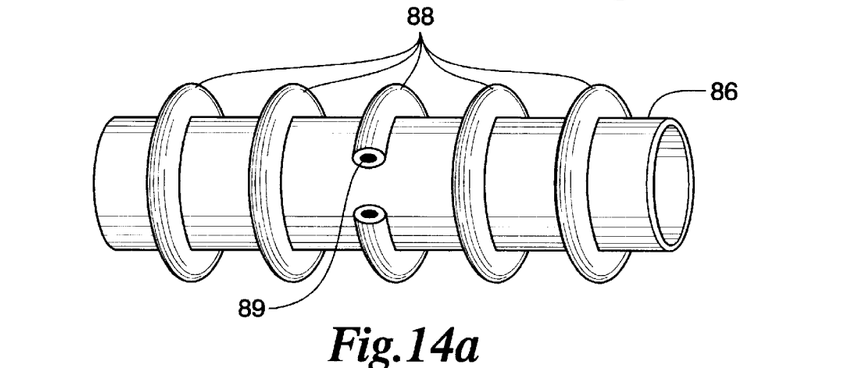
FIG. 14(a) is a perspective view of a tube having rings around its outer periphery that have a thin layer of HMAPM within them.
Figure 14B:
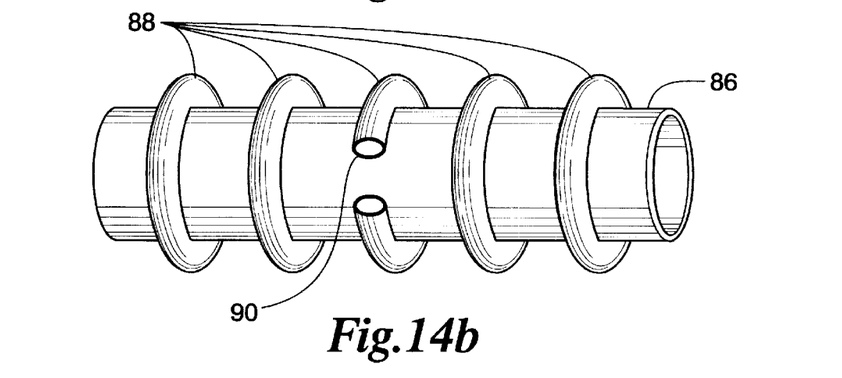
FIG. 14(b) is a perspective view of a tube having rings around its outer periphery that have a thin layer of HMAPM on the outside surface of the rings.

A container used to heat an article in accordance with this invention may be provided with a thin layer of HMAPM around at least a portion of its surface in any manner useful for the process being carried out. By way of example, FIGS. 13(a) and 13(b) show a ceramic container 82 in the shape of a crucible having a spiral quartz structure 84 formed about its outside surface. FIGS. 14(a) and 14(b) show a ceramic container 86 which is a tube having a number of quartz rings 88 around portions of its outer periphery. A thin carbon coating can be formed around the containers 82 and 86, respectively, by either filling the spiral 84 and/or the rings 88, respectively, with a thin layer of HMAPM powder 85 and 89, as shown in FIGS. 13(a) and 14(a) or by applying a thin layer of HMAPM paste 87 and 90 around the surface of the spiral 84 or the rings 88, respectively as shown in FIGS. 13(b) and 14(b).

Figure 15:
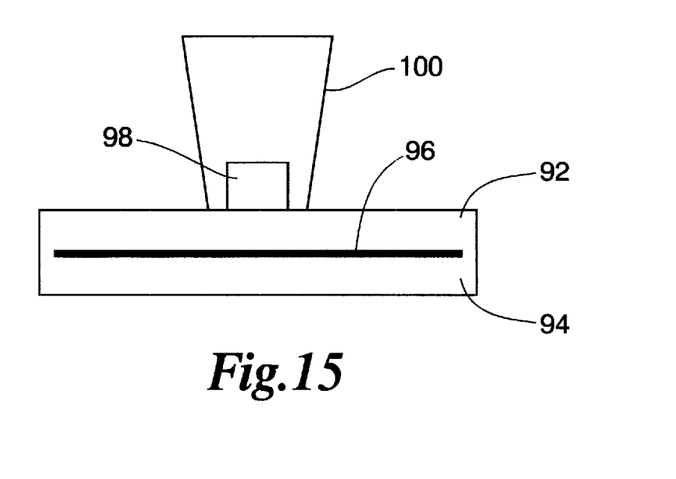
FIG. 15 is a cross section of a schematic diagram showing a thin layer of HMAPM between two flat plates for uneven heating of an article using the method of this invention.

FIG. 15 shows one embodiment of apparatus which can be used according to the method of this invention to provide uneven heating to a portion of an article being processed for applications, such as the processing of composite material, where a temperature gradient is desirable across the article. Two flat ceramic plates 92 and 94 have a space between them into which a thin layer of HMAPM 96 is placed. Thereafter the plates can be sealed in a convenient manner. An article to be heated 98 is placed within a crucible 100 which is located above the thin layer 96 on the plate 92. The bottom of the article 98 is adjacent the thin layer of HMAPM 96. When the arrangement shown in FIG. 15 is used within a microwave oven and microwave energy is applied, the thin layer of HMAPM absorbs microwave energy and heats the bottom of the article 98 to a greater extent than upper levels of the article 98 are heated.

Figures 16A, 16B:
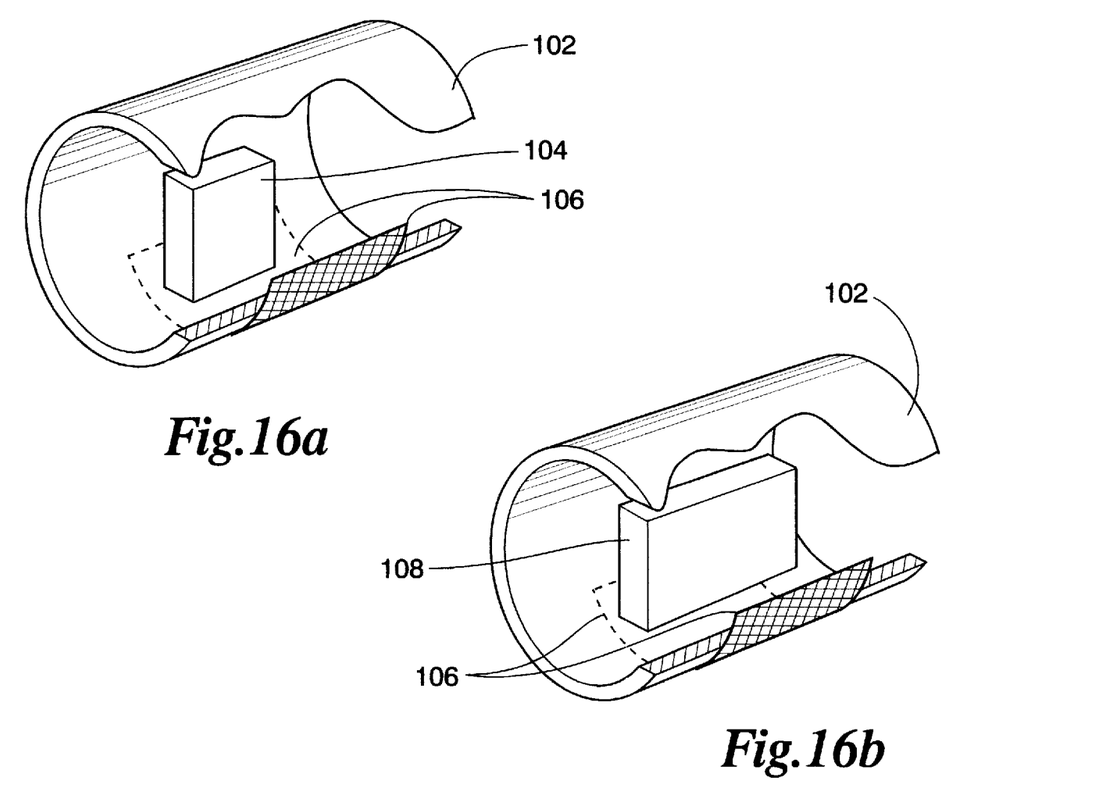
FIG. 16(a) is a perspective, cut away drawing showing a thin layer of HMAPM around a portion of the circumference of a container, with the length of the article being heated within the length of the thin layer.
FIG. 16(b) is a perspective, cut away drawing showing a thin layer of HMAPM around a portion of the circumference of a container, with the article being sintered partially within the length of the thin layer.

A temperature gradient can also be caused by other strategic locations of thin layers of HMAPM on containers or support surfaces of articles to be heated. By way of example, FIG. 16(a) shows a ceramic tube 102 having an article 104 within it to be heated. The tube 102 has a thin layer of HMAPM 106 around less than the total circumference of the tube 102. The article 104 is placed within the tube 102 at a position adjacent the thin layer of HMAPM material, causing the bottom of the article 104 to be heated to a greater extent than upper areas of that article.

FIG. 16(b) shows the same arrangement of the thin layer of HMAPM as shown in FIG. 16(a), with an article 108 to be heated that is somewhat longer than the article 104 shown in FIG. 16(a). An additional temperature gradient is created along the length of the article 108 by placing a portion of the length of the article 108 outside of the length of the thin layer 106. Those skilled in the art will recognize that numerous other sizes and shapes of containers and supports for articles being sintered and numerous shapes of thin layers of HMAPM can be used to obtain desired even heating or uneven heating of an article being processed in a microwave oven in accordance with this invention.

This invention has been described with reference to several illustrated embodiments. Many modifications and alterations of the method of this invention will occur to others upon reading and understanding the preceding specification. It is intended that this invention be construed as including all such alterations and modifications insofar as they come within the scope of the appended claims or the equivalents of these claims.

What is claimed is:

1. A method of heating with microwave energy an article made with monolithic metal comprising:
providing a thin layer of highly microwave absorbent powdered material around at least a portion of a container made of microwave transparent material;
placing the article, when the article is at a temperature at which plasma discharges normally occur as microwave energy is applied to the monolithic metal of the article, within the container at a position where the article is adjacent the layer of highly microwave absorbent powdered material; and
applying microwave energy to the container when the article is at the temperature at which plasma discharges normally occur.

2. A method of heating an article according to claim 1 in which the highly microwave absorbent powdered material comprises a material having a high percentage by weight of carbon content.

3. A method of heating an article according to claim 1 in which the highly microwave absorbent powdered material is chosen from the group consisting of carbon, carbon black, graphite, SiC and coal.

4. A method of heating an article according to claim 1 wherein the thin layer comprises a paste made by mixing the highly microwave absorbent powdered material with a liquid which is dried or allowed to dry after the paste is provided around at least a portion of the container.

5. A method of heating an article according to claim 1 wherein the thin layer comprises a paste made by mixing the highly microwave absorbent powdered material with water which is dried or allowed to dry after the paste is provided around at least a portion of the container.

6. A method of heating an article according to claim 1 wherein the thin layer is formed by placing dry, highly microwave absorbent powdered material between the walls of a multi-walled container.

7. A method of heating an article according to claim 1 wherein the thin layer is formed by placing dry, highly microwave absorbent powdered material between the walls of a dual-walled container, and the highly microwave absorbent powdered material is sealed between the two walls by a process chosen from the group consisting of vacuum sealing and sealing with an inert gas.

8. A method of heating an article according to claim 1 wherein the thin layer is held within a structure located around the container.

9. A method of heating an article according to claim 1 wherein the thin layer is retained within a spiral structure located around at least a portion of the container.

10. A method of heating an article according to claim 1 wherein a thin layer is provided on the outside of a spiral structure located around the circumference of at least a portion of the container.

11. A method of heating an article according to claim 1 wherein the thin layer is retained within a structure comprising at least one ring located around the circumference of at least a portion of the container.

12. A method of heating an article according to claim 1 wherein a thin layer is provided on the outside of at least one ring located around the circumference of at least a portion of the container.

13. A method of heating an article according to claim 1 wherein the container is chosen from the group consisting of a cylinder and a crucible.

14. A method of heating an article according to claim 1 wherein the thin layer is provided on the outside of the container.

15. A method of heating an article according to claim 1 in which the thin layer has a length which extends along at least the length of the article within the container.

16. A method of heating an article according to claim 1 wherein the thin layer is provided around the total circumference of at least a portion of the container.

17. A method of heating an article according to claim 1 wherein the thin layer is provided around less than the total circumference of the container, and a portion of the article to be heated to a greater extent than the balance of the article is placed adjacent the thin layer.

18. A method of heating an article according to claim 1 wherein the article is at room temperature when it is placed within the container.

19. A method of heating on article according to claim 1 in which the microwave energy has a frequency between 500 MHz and 10 GHz.

20. A method of heating an article according to claim 1 in which the microwave energy has a frequency of 2.45 GHz.

21. A method of heating an article according to claim 1 in which the container is placed in a second container made of microwave transmitting material, and a gas is flowed through the second container while microwave energy is applied to the container.

22. A method according to claim 1 wherein the article is made from monolithic metal chosen from the group consisting of Cu., Ag., Au., Pt., Al., Ga., Fe., steel, brass, W., Re., Ta., Mo., Nb., Ni., Co., V., Cr., Sn., and metal alloys and metal compositions of any of the foregoing metals.

23. A method of heating with microwave energy an article made with monolithic metal comprising:

providing a thin layer of highly microwave absorbent powdered material around a substantial portion of the total circumference of at least a portion of a container made of microwave transparent material, the thin layer having a length which is a significant portion of the length of the monolithic metal of the article; and placing the article, at a time when the article is at a temperature at which plasma discharges normally occur as microwave energy is applied to the monolithic metal of the article, within the container at a position where the article can be heated by radiant heat from the thin layer of highly microwave absorbent powdered material; and applying microwave radiation to the container to heat the article when the article is at the temperature at which plasma discharges normally occur.

24. A method of heating an article according to claim 23 in which the highly microwave absorbent powdered material comprises a material having a high percentage by weight of carbon content.

25. A method of heating an article according to claim 23 in which the highly microwave absorbent powdered material is chosen from the group consisting of carbon, carbon black, graphite, SiC and coal.

26. A method of heating an article according to claim 23 wherein the thin layer comprises a paste made by mixing the highly microwave absorbent powdered material with a liquid which is dried or allowed to dry after the paste is provided around at least a portion of the container.

27. A method of heating an article according to claim 23 wherein the thin layer comprises a paste made by mixing the highly microwave absorbent powdered material with water which is dried or allowed to dry after the paste is provided around at least a portion of the container.

28. A method of heating an article according to claim 23 wherein the thin layer is formed by placing dry, highly microwave absorbent powdered material between the walls of a multi-walled container.

29. A method of heating an article according to claim 23 wherein the thin layer is formed by placing dry, highly microwave absorbent powdered material between the walls of a dual-walled container, and the highly microwave absorbent powdered material is sealed between the two walls by a process chosen from the group consisting of vacuum sealing and sealing with an inert gas.

30. A method of heating an article according to claim 23 wherein the thin layer is held within a structure located around the container.

31. A method of heating an article according to claim 23 wherein the thin layer is retained within a spiral structure located around at least a portion of the container.

32. A method of heating an article according to claim 23 wherein a thin layer is provided on the outside of a spiral structure located around the circumference of at least a portion of the container.

33. A method of heating an article according to claim 23 wherein the thin layer is retained within a structure comprising at least one ring located around the circumference of at least a portion of the container.

34. A method of heating an article according to claim 23 wherein a thin layer is provided on the outside of at least one ring located around the circumference of at least a portion of the container.

35. A method of heating an article according to claim 23 wherein the container is chosen from the group consisting of a cylinder and a crucible.

36. A method of heating an article according to claim 23 wherein the thin layer is provided on the outside of the container.

37. A method of heating an article according to claim 23 in which the thin layer has a length which extends along at least the length of the article within the container.

38. A method of heating an article according to claim 23 wherein the thin layer is provided around the total circumference of at least a portion of the container.

39. A method of heating an article according to claim 23 wherein the thin layer is provided around less than the total circumference of the container, and a portion of the article to be heated to a greater extent than the balance of the article is placed adjacent the thin layer.

40. A method of heating an article according to claim 23 wherein the article is at room temperature when it is placed within the container.

41. A method of heating on article according to claim 23 in which the microwave energy has a frequency between 500 MHz and 10 GHz.

42. A method of heating an article according to claim 23 in which the microwave energy has a frequency of 2.45 GHz.

43. A method of heating an article according to claim 23 in which the container is placed in a second container made of microwave transmitting material, and a gas is flowed through the second container while microwave energy is applied to the container.

44. A method of heating an article according to claim 23 wherein the article is made from monolithic metal chosen from the group consisting of Cu., Ag., Au., Pt., Al., Ga., Fe., steel, brass, W., Re., Ta., Mo., Nb., Ni., Co., V., Cr., Sn., and metal alloys and metal compositions of any of the foregoing metals.

45. A method of heating an article according to claim 23 wherein the article is made from monolithic metal chosen from the group consisting of Cu., Ag., Au., Pt., Al., Ga., Fe., steel, brass, W., Re., Ta., Mo., Nb., Ni., Co., V., Cr., Sn., and metal alloys and metal compositions of any of the foregoing metals and the microwave energy is applied to heat the article until it melts.

46. A method of heating an article made of monolithic metal with microwave energy comprising:
  providing a thin layer of highly microwave absorbent powdered material around at least a part of the circumference of at least a portion of the length of a container made of microwave transmitting material;
  providing the article at a temperature at which plasma discharges normally occur when microwave energy is applied directly to the monolithic metal of the article;
  placing the article within the container at a position where a portion of the length of the article is adjacent a substantial portion of the length of the thin layer of highly microwave absorbent powdered material, with the thin layer of highly microwave absorbent material having a length and total areas sufficient to heat the article without significant plasma discharge occurring; and
  applying microwave energy to the container to heat the article to a temperature above a critical temperature at which the monolithic metal out of which the article is made no longer causes plasma discharges to occur when microwave radiation is applied directly to it.

47. A method according to claim 46 wherein the article is made from monolithic metal chosen from the group consisting of Cu., Ag., Au., Pt., Al., Ga., Fe., steel, brass, W., Re., Ta., Mo., Nb., Ni., Co., V., Cr., Sn., and metal alloys and metal compositions of any of the foregoing metals.

48. A method according to claim 46 wherein the article is made from monolithic metal chosen from the group consisting of Cu., Ag., Au., Pt., Al., Ga., Fe., steel, brass, W., Re., Ta., Mo., Nb., Ni., Co., V., Cr., Sn., and metal alloys and metal compositions of any of the foregoing metals and the microwave energy is applied to heat the article until it melts.

49. A method of heating an article according to claim 46 in which the highly microwave absorbent powdered material comprises a material having a high percentage by weight of carbon content.

50. A method of heating an article according to claim 46 in which the highly microwave absorbent powdered material is chosen from the group consisting of carbon, carbon black, graphite, SiC and coal.

51. A method of heating an article according to claim 46 wherein the thin layer comprises a paste made by mixing the highly microwave absorbent powdered material with a liquid which is dried or allowed to dry after the paste is provided around at least a portion of the container.

52. A method of heating an article according to claim 46 wherein the thin layer comprises a paste made by mixing the highly microwave absorbent powdered material with water which is dried or allowed to dry after the paste is provided around at least a portion of the container.

53. A method of heating an article according to claim 46 wherein the thin layer is formed by placing dry, highly microwave absorbent powdered material between the walls of a multi-walled container.

54. A method of heating an article according to claim 46 wherein the thin layer is formed by placing dry, highly microwave absorbent powdered material between the walls of a dual-walled container, and the highly microwave absorbent powdered material is sealed between the two walls by a process chosen from the group consisting of vacuum sealing and sealing with an inert gas.

55. A method of heating an article according to claim 46 wherein the thin layer is held within a structure located around the container.

56. A method of heating an article according to claim 46 wherein the thin layer is retained within a spiral structure located around at least a portion of the container.

57. A method of heating an article according to claim 46 wherein a thin layer is provided on the outside of a spiral structure located around the circumference of at least a portion of the container.

58. A method of heating an article according to claim 46 wherein the thin layer is retained within a structure comprising at least one ring located around the circumference of at least a portion of the container.

59. A method of heating an article according to claim 46 wherein a thin layer is provided on the outside of at least one ring located around the circumference of at least a portion of the container.

60. A method of heating an article according to claim 46 wherein the container is chosen from the group consisting of a cylinder and a crucible.

61. A method of heating an article according to claim 46 wherein the thin layer is provided on the outside of the container.

62. A method of heating an article according to claim 46 in which the thin layer has a length which extends along at least the length of the article within the container.

63. A method of heating an article according to claim 46 wherein the thin layer is provided around the total circumference of at least a portion of the container.

64. A method of heating an article according to claim 46 wherein the thin layer is provided around less than the total circumference of the container, and a portion of the article to be heated to a greater extent than the balance of the article is placed adjacent the thin layer.

65. A method of heating an article according to claim 46 wherein the article is at room temperature when it is placed within the container.

66. A method of heating on article according to claim 46 in which the microwave energy has a frequency between 500 MHz and 10 GHz.

67. A method of heating an article according to claim 46 in which the microwave energy has a frequency of 2.45 GHz.

68. A method of heating an article according to claim 46 in which the container is placed in a second container made of microwave transmitting material, and a gas is flowed through the second container while microwave energy is applied to the container.

69. A method of heating with microwave energy an article made with monolithic metal comprising:

applying a thin layer of highly microwave absorbent powdered material on a sheet of material made of microwave transmitting material;

placing the article, when it is at a temperature at which plasma discharges normally occur when microwave energy is applied to the monolithic metal of the article, on the sheet of material at a position where at least a portion of the article is adjacent the thin layer of highly microwave absorbent powdered material; and applying microwave energy to the sheet of material to heat the article when the article is at the temperature at which plasma discharges normally occur.

70. A method of heating an article according to claim 69 wherein the thin layer comprises a paste made by mixing the highly microwave absorbent powdered material with a liquid which is dried or allowed to dry after the paste is provided on at least a portion of the sheet.

71. A method of heating an article according to claim 69 wherein the thin layer comprises a paste made by mixing the highly microwave absorbent powdered material with water which is dried or allowed to dry after the paste is provided on at least a portion of the sheet.

72. A method of heating an article according to claim 69 wherein the thin layer is formed by placing dry, highly microwave absorbent powdered material between the walls of a multi-walled sheet.

73. A method of heating an article according to claim 69 wherein the thin layer is formed by placing dry, highly microwave absorbent powdered material between the walls of a dual-walled sheet, and the highly microwave absorbent powdered material is sealed between the two walls by a process chosen from the group consisting of vacuum sealing and sealing with an inert gas.

* * * * *